Aug. 7, 1945.  E. W. PUMMILL  2,380,994
SELF-LOCKING NUT OR BOLT
Filed Dec. 11, 1943
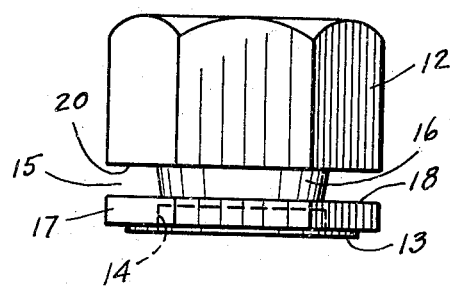
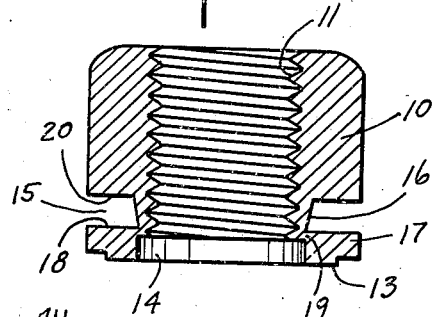
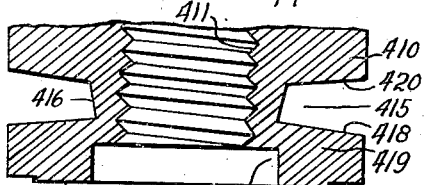
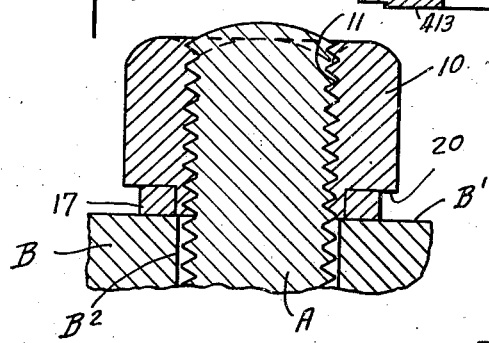
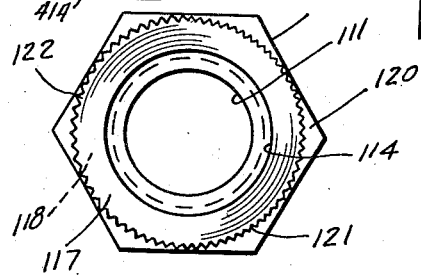
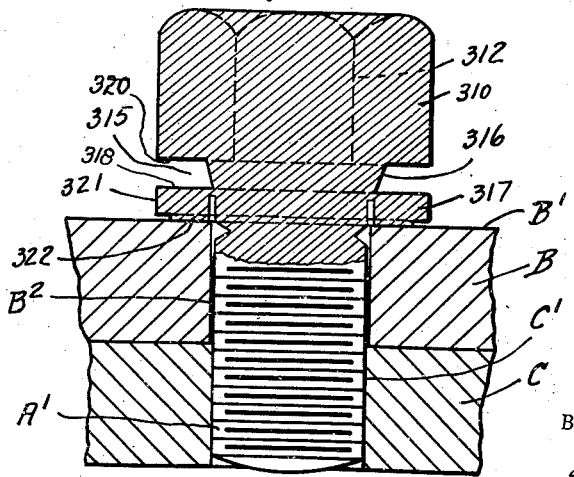
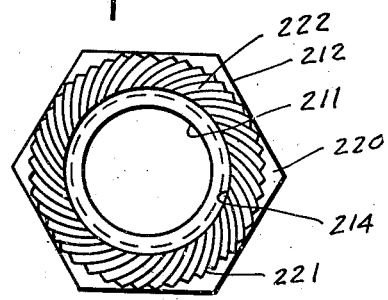
INVENTOR.
EDWIN W. PUMMILL.
BY Lockwood, Goldsmith & Galt
ATTORNEYS.

Patented Aug. 7, 1945

2,380,994

UNITED STATES PATENT OFFICE 2,380,994

SELF-LOCKING NUT OR BOLT

Edwin W. Pummill, Indianapolis, Ind.

Application December 11, 1943, Serial No. 513,829

11 Claims. (Cl. 151—19)

This invention relates to a combination washer and integral nut or bolt member.

The chief object of this invention is to provide a bolt or nut with a washer integral therewith, which may be almost as expeditiously manufactured by automatic screw machines and the like as the conventional corresponding nut and bolt members.

Another chief object of this invention is to provide such a threaded member with a washer whereby in the threading operation upon a threaded member or into a threaded member respectively, the washer portion is sheared from the main body portion by pressure parallel to the axis and a portion of the washer is, upon continued threading operation so effective that it automatically locks the nut or bolt against subsequent accidental unthreading.

In addition to all the advantages incident to automatic screw machine fabrication the present invention lends itself to the expeditious use of the nut or bolt in that a washer and a nut, or a washer and a bolt, need not be handled for anchoring or connection purposes, but only one element need be handled. This naturally reduces application operation time and also reduces accidental losses incident to dropping the washer and/or the nut and/or the bolt when the mechanic attempts to apply both as independent elements.

Another chief object of the invention is to provide a washer integral with a threaded member whereby the unitary structure may be handled as a single member with its attendant advantages.

The chief feature of the invention consists in forming in the body an external peripheral channel defining a predetermined demarcation between a subsequently detached washer and the threaded member, such channel having an inclined inner wall whereby a frusto-conical connection is provided between the main body portion and the washer portion.

Another feature of the invention resides in providing upon the exterior face of the washer portion an annular chamber or groove, as the case may be, and this chamber or groove has an outside diameter larger than the threaded opening through the nut or the threaded stem of the cap bolt. This second exterior chamber or groove constitutes a counter-bore.

Other objects and features will be set forth more fully hereinafter.

The full nature of the invention will be understood from the accompanying drawing and the following description and claims:

In the drawing

Fig. 1 is a side elevation of a nut embodying the invention.

Fig. 2 is a central sectional view of the same.

Fig. 3 is a somewhat similar view of said parts associated with a support and threaded member and with the washer and nut in collapsed and locking relation.

Fig. 4 is a bottom plan or face view of the washer and of a modified form of the nut.

Fig. 5 is a similar view of a still further modified form of a nut.

Fig. 6 is a central sectional view of a bolt embodiment of the invention applied to a pair of members to be secured together by said bolt, all being illustrated in the position immediately prior to bolt-washer separation.

Fig. 7 is an enlarged central sectional view of a modified form of the invention.

In Figs. 1, 2 and 3 of the drawing, 10 indicates the body portion of the nut which has a central bore 11 therethrough which is conventionally threaded. The exterior is of suitable polygonal form as indicated at 12. Herein this nut is shown as a hex nut and is formed preferably from hexagonal stock upon an automatic screw machine, which drills the hole and taps the same and then cuts off the finished product from the main body of the stock, the latter, following cut off, being progressively advanced for repeated operations and successive formations of the nuts.

Intermediate between cut off and drilling and tapping, a counter bore tool is brought into axial engagement with the face 13 of the stock to form the central chamber, groove or counter bore 14. This central chamber has a diameter slightly larger than the central threaded bore 11. Also, between the two first mentioned operations there is laterally presented to the projecting stock a tool which cuts therein the peripheral channel 15. The forward end of this tool is so arranged as to leave the central stock portion 16 as of frusto-conical character, see Fig. 2. The tool also may be slightly wedge shaped to form the peripheral groove illustrated in Fig. 7.

Preferably, but not necessarily, the resulting washer 17 formed by such peripheral grooving operation is slightly less in thickness than the width of the channel 15, although it may be equal to or greater than said width. Preferably, the inclination of any element of the frusto-conical portion 16 is inclined at an angle of from five to thirty degrees to the axis of the nut. The depth of the chamber 14 may be equal to the outer thickness of the washer or slightly less than the same.

It will be observed that the minor diameter of the frusto-conical portion, when that form is employed, is immediately adjacent the face 18 of the washer 17 and this diameter is slightly greater than the diameter of said chamber 14. It is to be here observed that the greater the angle of conical element inclination the tighter will be the hold that the washer effects between the member to be held and the nut.

In Fig. 3, B indicates a member from which projects the threaded end of a conventional bolt A. When the nut shown in Figs. 1 and 2 is threaded thereon no deformation or other action occurs until the washer portion 17 bears on the face B1 of the said member. If continued threading action is imposed upon the nut, the integral connection, indicated by 19, see Fig. 2, between the washer and the frusto-conical portion then is sheared as a result of pressure exerted parallel to the axis and this frusto-conical portion advances toward the member B and does two things: First, the middle of the frusto-conical portion crowds into the chamber 14 around the bolt A and ultimately binds thereon and thereabout. Secondly, the outer frusto-conical surface of the projecting portion 16 exerts upon the washer 17 outwardly or radially and downwardly or axially directed forces and this wedging pressure, incident to threading operation and the pressure incident to the conical portion crowding into the channel 14, cups, as it were, the washer 17, so that the faces 18 and 20 are in intimate contact for nut locking upon the bolt A.

Actual experimentation shows that this contact is peripheral and in amount is equal to the width of the washer measured from the outer wall of chamber counter bore 14 to the inscribed circle of the polygonal periphery of said washer if of polygonal exterior.

Reference will now be had to Fig. 4. In this form of the invention 112 indicates the polygonal outline as before, 120 the washer adjacent face of the nut portion, 111 the threaded bore, 114 the chamber in the washer and 117 the washer portion. Herein the periphery of the washer, which periphery is indicated by the numeral 121, is knurled and this periphery is substantially annular and the outside diameter of said washer naturally cannot be any greater than the inscribed circle of the hexagonal stock. It may, however, have a diameter slightly less than this maximum diameter. Knurling of this washer periphery provides on the face corresponding to the face 118 a rough circular portion and on the opposite edge of face 122, or member engaging face, is a similar roughened ring. The operation is as before with this addition, that as the locking pressure becomes progressively greater, these roughened portions tend to bite into the surface B1 of the member B and the surface 120 of the nut portion, thereby insuring greater gripping action.

Fig. 5 illustrates a similar modification and in this figure numerals of the 200 series, similar to numerals of the 100 series employed in Fig. 4, designate parts identical to, or similar to those designated by the 100 series in Fig. 4. This form of the invention only differs from that shown in Fig. 4 by having the face 222 of the washer, which is to engage the face B1 of the member B, knurled as by a scroll type knurling. It may be of any other type. This additional knurling naturally provides still additional gripping.

Reference will now be had to Fig. 6. In this form of the invention there is illustrated the shank portion A' of a bolt member, the head of which has a polygonal formation 312 and formed therein is a exterior peripheral channel 315 adjacent the shank connection so as to form the frusto-conical portion 316 and the integral washer portion 317.

This form of the invention may or may not include an annular channel or external groove in the face 322 similar to the chamber 14. The periphery 321 of the washer 317 may be hexagonal, as shown, thus corresponding to Figs. 1 to 3, inclusive, relative to the first nut form, or this may be annular as in Figs. 4 and 5 and knurled as well. Also, the face 322 corresponding to the nut shown in Fig. 5 may be similarly knurled. The action herein is the same as previously described.

Threading of the bolt shown in Fig. 6 into the threaded aperture C1 of the member C and through the aperture B2 in the member B forces the washer portion of the head of the bolt into engagement with the surface B1 and the action occurs as previously described, referring more particularly to Fig. 3. In Fig. 3, the member B may not be threaded, as shown at B2, and mount the bolt A, but may be apertured as shown at B2 in Fig. 6.

Another advantage of the aforesaid in the washer is that when threaded home and tightened down, the metal within the washer counterbore tightly grips the threaded bolt or like member, so that rocking of the nut cannot occur, which means that vibration will not wear the thread and ultimately work the nut loose. This is because the thread lock is at the retaining face of the nut and not at the remote face nor intermediate same. Hence, this clinched nut locks at what normally would be the bearing point instead of at the head of the nut or intermediate same.

Also a bolt and nut set with lock washers, or ordinary washers, would require four members. Herein but two are required to be handled.

The effectiveness of this invention is to place it immediately below the locking effect obtained by riveting plus the advantage that all nuts, bolts or nuts and bolts can be initially tightened to bring the members to be connected together and then clinched, or lock tightened, which, in effect, is what is obtained in riveting, but no placement bolt and nut removal is required as is necessary in riveting.

In Fig. 7 there is illustrated a nut-washer embodiment of the invention wherein the confronting faces 420—418 are each inclined inwardly and towards each other.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A clincher locking nut and washer structure comprising a threaded nut at one end of the structure, a washer at the other end of the structure and having an outwardly exposed threadless recess forming a bore and of a diameter greater than that of the nut thread, and a reduced diameter frusto-conical projection on the nut and interposed between the nut and the washer and initially integral with each and having its smaller end at the washer connection thereto, the nut threading being extended into the projection, said smaller end being axially severable from the washer and receivable by the washer bore and progressively compressible into said bore in relative axial movement between the nut and washer for thread gripping purposes.

2. A self-locking clincher type threaded member, such as a threaded member for threaded association with a complementary threaded member, said first member comprising a head and body portion, an integral washer portion having an unthreaded recess of a diameter greater than that of the maximum diameter of the threaded portion of the second mentioned member, and a reduced diameter frusto-conical portion between the head and body portion and the said washer portion and initially integral with both portions and having its smallest portion connected to the washer portion and axially shearable therefrom upon threading the first mentioned member home, the stock of the frusto-conical portion engaging and locking to the threading of the complementary member, threading in the tightening direction effecting frusto-conical wedge gripping of the second mentioned threaded member and effecting radially outward stressing of the severed washer portion, the washer portion and body portion adjacent faces then having frictional locking contact incident to pressure parallel to the axis of the first mentioned threaded member, the opposite face of the washer portion incident to the applied parallel pressure also having frictional locking contact.

3. A self-locking, clincher type threaded member as defined by claim 2 wherein initial seating of the frusto-conical portion in the washer recess axially deforms the aforesaid adjacent face of the washer portion toward the head and body portion adjacent face and subsequent threading of the head and body portion effects facial contact of said adjacent faces and deformation penetration of the frusto-conical portion adjacent its connection to the head and body portion for unitizing the washer portion and head and body portions.

4. Structure as defined by claim 1 wherein the washer and nut have similar exterior peripheral outlines permitting tool single application thereto.

5. Structure as defined by claim 1 wherein the washer and nut have dissimilar peripheral outlines, that of the nut being a regular polygon and that of the washer being circular and of a size no greater than the largest circle inscribable within the nut polygonal outline.

6. Structure as defined by claim 1 wherein the washer recess is substantially filled by the frusto-conical projection when the washer and nut are reunited by threading action of the nut.

7. Structure as defined by claim 1 wherein the nut threading pressure applied to the washer, following severance of same, interiorly beads the washer adjacent the projection and forces the bead radially inward into the projection adjacent its connection to the nut for additionally locking the nut and washer together.

8. Structure as defined by claim 1 wherein the washer and nut initially have confronting faces spaced by said projection, one of the said confronting faces being inclined slightly outwardly and away from the other confronting face.

9. Structure as defined by claim 1 wherein the washer and nut initially have slightly outwardly inclined confronting faces.

10. Structure as defined by claim 1 wherein the initial seating of the projection in the washer recess following washer severance effects central positioning of the washer, subsequent seating of said projection in the recess effecting peripheral beading of the washer at the recess and on the nut confronting face thereof and final seating of the projection in the recess effecting beading penetrating of the projection adjacent the nut connection thereto for washer and nut locking connection therebetween, said washer being radially expansible outwardly incident to projection penetration into the recess and said projection incident thereto being radially compressible inwardly for thread locking purpose, successive seating operations being effected solely by additional nut threading in the tightening direction.

11. A unitary nut and washer structure including a nut body with a threaded bore therethrough, a washer body initially integral and finally rigid with the nut body and having a threadless opening therein of a diameter appreciably greater than that of the bore and coaxial therewith, and a neck between both bodies and initially integral with both bodies and initially connecting same together and rupturable from the washer by axial pressure when the structure is applied to and initially tightened down on a threaded member in said bore, said neck having a cross-sectional area appreciably greater than that of the threaded bore, the latter being extended into the neck and at least for an appreciable portion of the length of the neck, the diameter of the neck at a plurality of transverse sections being at least greater than that of the washer opening.

EDWIN W. PUMMILL.